United States Patent
Lu et al.

(10) Patent No.: US 11,608,439 B2
(45) Date of Patent: Mar. 21, 2023

(54) ADHESIVE PROMOTER, ORGANIC SILICON ENCAPSULANT COMPOSITION, AND ORGANIC SILICON ENCAPSULANT

(71) Applicant: LITE-ON OPTO TECHNOLOGY (CHANGZHOU) CO., LTD., Changzhou (CN)

(72) Inventors: Ju-Shan Lu, Changzhou (CN); Peng Qu, Lianyungang (CN); Shu-Yong Jia, Changzhou (CN)

(73) Assignee: LITE-ON OPTO TECHNOLOGY (CHANGZHOU) CO., LTD., Changzhou (CN)

( * ) Notice: Subject to any disclaimer, the term of this patent is extended or adjusted under 35 U.S.C. 154(b) by 266 days.

(21) Appl. No.: 16/999,354

(22) Filed: Aug. 21, 2020

(65) Prior Publication Data

US 2021/0054201 A1    Feb. 25, 2021

(30) Foreign Application Priority Data

Aug. 23, 2019   (CN) .......................... 201910784619.9

(51) Int. Cl.
| | |
|---|---|
| *C08G 77/12* | (2006.01) |
| *C08L 83/04* | (2006.01) |
| *C08G 79/08* | (2006.01) |
| *C08G 77/56* | (2006.01) |

(52) U.S. Cl.
CPC .............. *C08L 83/04* (2013.01); *C08G 77/12* (2013.01); *C08G 77/56* (2013.01); *C08G 79/08* (2013.01)

(58) Field of Classification Search
CPC ........ C08G 77/12; C08G 77/20; C08G 77/80; C08L 83/04; C08K 5/55
See application file for complete search history.

(56) References Cited

U.S. PATENT DOCUMENTS

| | | | | |
|---|---|---|---|---|
| 5,112,779 | A | * | 5/1992 | Burns ................... C04B 35/571 501/96.2 |
| 2016/0340580 | A1 | | 11/2016 | Hayashi et al. |
| 2017/0253700 | A1 | | 9/2017 | Dogen et al. |

FOREIGN PATENT DOCUMENTS

CN          101959939 A          1/2011

\* cited by examiner

*Primary Examiner* — Kuo Liang Peng
(74) *Attorney, Agent, or Firm* — Li & Cai Intellectual Property (USA) Office

(57) ABSTRACT

An adhesive promoter, an organic silicon encapsulant composition, and an organic silicon encapsulant are provided. The adhesive promoter used for the organic silicon encapsulant is formed from a borosiloxane polymer represented by a general formula of: $(R^1R^2_2SiO_{1/2})_x(R^2R^3SiO_{2/2})_y$ $(R^3SiO_{3/2})_z(SiO_{4/2})_i(BO_{(3-k)/2})_j(OR^4)_k$. $R^1$ is a hydrogen atom or a C2-C6 alkenyl group. $R^2$ and $R^4$ are respectively a C1-C6 alkyl group. $R^3$ is a C6-C12 aromatic group. In the general formula, x, y, z, i, j, and k represent a molar ratio. In the general formula, x, y, z, i, and j are a non-negative number smaller than or equal to 1, and k is a positive number $\leq 3$. A sum of x, y, z, and i is 1, and x is larger than 0.

13 Claims, No Drawings

ADHESIVE PROMOTER, ORGANIC SILICON ENCAPSULANT COMPOSITION, AND ORGANIC SILICON ENCAPSULANT

CROSS-REFERENCE TO RELATED PATENT APPLICATION

This application claims the benefit of priority to China Patent Application No. 201910784619.9, filed on Aug. 23, 2019 in People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an adhesive promoter and applications thereof, and more particularly to the adhesive promoter and applications thereof related to light-emitting diode (LED).

BACKGROUND OF THE DISCLOSURE

A light-emitting diode (LED) is a kind of semiconductor assembly. The LED can convert electric energy into luminous energy efficiently and has advantages of long service life and low energy requirement. Therefore, the LED has been widely applied in various products.

After being manufactured, the LED is packaged so that the LED can be protected and can be assembled with other components. In the packaging process, the LED is disposed on a frame so as to connect with external circuits. In addition, the LED is encapsulated by an encapsulant to prevent water vapor from permeating into and then contacting to the LED. Accordingly, the service life of the LED can be prolonged after the packaging process.

Epoxy resin and organic resin/rubber are common encapsulants. Epoxy resin has advantages of high transmittance, simple curing steps, and outstanding physical properties after being cured. Therefore, epoxy resin is widely used for packaging or sealing purposes. However, epoxy resin has poor ageing resistance. A yellowing phenomenon may easily occur with epoxy resins at a high temperature environment, which causes a degradation of transmittance. Therefore, epoxy resin is inappropriate to be applied in a high power LED which generates a large amount of heat.

Organic silicon resin also has an advantage of high transmittance so that organic silicon resin is used as another common encapsulant. Organic silicon resin contains Si—O bond whose bond energy reaches up to 422 KJ/mol, so that the cured organic silicon resin has a stable chemical structure. Even at a high temperature environment or an environment with high-intensity radiation, organic silicon resin is hard to exhibit yellowing. Therefore, compared to epoxy resin, organic silicon resin is more suitable for being applied in the high power LED and acting as an encapsulant, or applied in other products which work under a strict environment.

Generally, a material of the frame can be metal, plastic, liquid crystal polymer (LCP), or inorganic ceramic. Specifically, the metal can be gold, silver, copper, or aluminum; the plastic can be polyphthalamide (PPA), epoxy molding compound (EMC), polycarbonate (PC), silicone molding compound (CMC), or polybutylene terephthalate (PBT). It should be noted that surface energies of the material of the frame mentioned previously are universally low. From a thermodynamic viewpoint, the frame is difficult to be encapsulated by other materials (the encapsulants). Therefore, in the packaging process, the encapsulant is difficult to be firmly connected with the frame because a connecting force between the encapsulant and the frame is limited. Once the encapsulant is under a high temperature and high humidity environment or under an environment with a rapid change of temperatures, the encapsulant may be separated from the frame due to ageing. When the LED is exposed from the encapsulant, the LED may come in contact with water vapor, thereby shortening the service life of the LED.

Therefore, in order to strengthen the connecting force between the encapsulant and the frame, a primer is coated on the frame before a disposition of the encapsulant. In this way, however, the number of necessary steps of the packaging process would be increased. Further, the same kind of the primer would not be suitable for all of the frames that have different materials. Accordingly, a way of enhancing the adhesive force between the encapsulant and the frame by adding an additive (or called an adhesive promoter) in the encapsulant is much sought after, so that the number of steps of the packaging process will not be increased. Nevertheless, the conventional adhesive promoters in the market cannot provide such an anticipated effect.

SUMMARY OF THE DISCLOSURE

In response to the above-referenced technical inadequacies, the present disclosure provides an adhesive promoter, an organic silicon encapsulant composition, and an organic silicon encapsulant.

In one aspect, the present disclosure provides an adhesive promoter. The adhesive promoter used for an organic silicon encapsulant is formed from a borosiloxane polymer. The borosiloxane polymer is represented by a general formula of: $(R^1R^2_2SiO_{1/2})_x(R^2R^3SiO_{2/2})_y(R^3SiO_{3/2})_z(SiO_{4/2})_i(BO_{(3-k)/2})_j(OR^4)_k$. $R^1$ is a hydrogen atom or an alkenyl group having 2 to 6 carbon atoms. $R^2$ and $R^4$ are respectively an alkyl group having 1 to 6 carbon atoms. $R^3$ is an aromatic group having 6 to 12 carbon atoms. In the general formula, x, y, z, i, j, and k respectively represent a molar ratio, x, y, z, i, and j are a non-negative number smaller than or equal to 1, and k is a positive number smaller than or equal to 3. A sum of x, y, z, and i is 1, and x is larger than 0.

In certain embodiments, the present disclosure provides an adhesive promoter. In the general formula, x ranges from 0.01 to 0.5, y ranges from 0 to 0.5, z ranges from 0 to 0.8, i ranges from 0 to 0.7, j ranges from 0.01 to 1, and k ranges from 1 to 3.

In certain embodiments, the present disclosure provides an adhesive promoter. The borosiloxane polymer contains Si—O—B bonds.

In certain embodiments, the present disclosure provides an adhesive promoter. In the general formula, $R^1$ is a hydrogen atom, a substituted or unsubstituted ethylene group, or a substituted or unsubstituted propylene group.

In certain embodiments, the present disclosure provides an adhesive promoter. In the general formula, $R^2$ is a substituted or unsubstituted methyl group, or a substituted or unsubstituted ethyl group.

In certain embodiments, the present disclosure provides an adhesive promoter. In the general formula, $R^3$ is a substituted or unsubstituted phenyl group.

In certain embodiments, the present disclosure provides an adhesive promoter. In the general formula, $R^4$ is a substituted or unsubstituted methyl group, or a substituted or unsubstituted ethyl group.

In another aspect, the present disclosure provides an organic silicon encapsulant composition. The organic silicon encapsulant composition includes 25 phr to 80 phr of a polysiloxane having alkenyl group, 5 phr to 70 phr of a polysiloxane having silyl hydride group, 0.001 phr to 0.1 phr of a catalyst for hydrosilylation reaction, and 0.01 phr to 5 phr of an adhesive promoter which is a borosiloxane polymer being represented by a general formula: $(R^1R^2{}_2SiO_{1/2})_x (R^2R^3SiO_{2/2})_y (R^3SiO_{3/2})_z (SiO_{4/2})_i (BO_{(3-k)/2})_j (OR^4)_k$. In the general formula, $R^1$ is a hydrogen atom or an alkenyl group having 2 to 6 carbon atoms, $R^2$ and $R^4$ are respectively an alkyl group having 1 to 6 carbon atoms, and $R^3$ is an aromatic group having 6 to 12 carbon atoms. In the general formula, x, y, z, i, j, and k respectively represent a molar ratio. In the general formula, x, y, z, i, and j are respectively a non-negative number smaller than or equal to 1, k is a positive number smaller than or equal to 3, a sum of x, y, z, and i is 1, and x is larger than 0.

In certain embodiments, the present disclosure provides an organic silicon encapsulant composition. A molar ratio of the alkenyl group of the polysiloxane having alkenyl group to the silyl hydride group of the polysiloxane having silyl hydride group ranges from 0.5 to 2.5.

In certain embodiments, the present disclosure provides an organic silicon encapsulant composition. The alkenyl group of the polysiloxane having alkenyl group is represented by a general formula of: $(R^aR^b{}_2SiO_{1/2})_o (R^bR^c SiO_{2/2})_p (R^cSiO_{3/2})_q (SiO_{4/2})_r$. In the general formula, $R^a$ is an alkenyl group having 2 to 6 carbon atoms, $R^b$ is an alkyl group having 1 to 6 carbon atoms, and $R^c$ is an aromatic group having 6 to 12 carbon atoms. In the general formula, o, p, q, and r respectively represent a molar ratio, o, p, q, and r are respectively a positive number smaller than 1, a sum of o, p, q, and r is 1, and o is larger than 0.

In certain embodiments, the present disclosure provides an organic silicon encapsulant composition. In the general formula, o ranges from 0.1 to 0.35, p ranges from 0 to 0.4, q ranges from 0 to 0.75, and r ranges from 0 to 0.65.

In certain embodiments, the present disclosure provides an organic silicon encapsulant composition. The polysiloxane having silyl hydride group is represented by a general formula of: $(HR^e{}_2SiO_{1/2})_s (R^eR^f SiO_{2/2})_t (R^f SiO_{3/2})_u (SiO_{4/2})_v$. In the general formula, $R^e$ is an alkyl group having 1 to 6 carbon atoms, and $R^f$ is an aromatic group having 6 to 12 carbon atoms. In the general formula, s, t, u, and v are respectively a non-negative number smaller than or equal to 1, a sum of s, t, u, and v is 1, and s is larger than 0.

In certain embodiments, the present disclosure provides an organic silicon encapsulant composition. In the general formula, s ranges from 0.1 to 0.4, t ranges from 0 to 0.4, u ranges from 0 to 0.6, and v ranges from 0 to 0.6.

In yet another aspect, the present disclosure provides an organic silicon encapsulant. The organic silicon encapsulant is solidified from the organic silicon encapsulant composition. A thrust force of the organic silicon encapsulant on an aluminum metal ranges from 5.7 MPa to 10 MPa.

In certain embodiments, the present disclosure provides an organic silicon encapsulant. A light transmittance of the organic silicon encapsulant is larger than or equal to 90%.

Therefore, the technical features of "the organic silicon encapsulant is formed from a borosiloxane polymer" and "$R^1$ is a hydrogen atom or an alkenyl group having 2 to 6 carbon atoms" can enhance the compatibility between the adhesive promoter and the organic silicon resin in the organic silicon encapsulant composition and enhance the connecting force between the organic silicon encapsulant composition and the frame, thereby allowing the organic silicon encapsulant composition to be applied in a packaging structure of the LED.

These and other aspects of the present disclosure will become apparent from the following description of the embodiment taken in conjunction with the following drawings and their captions, although variations and modifications therein may be affected without departing from the spirit and scope of the novel concepts of the disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure provides an adhesive promoter which can be incorporated with organic silicon resin to form an organic silicon resin composition. The organic silicon resin composition can be applied to be a packaging structure, especially for a packaging structure of the LED. The adhesive promoter has a good compatibility with the organic silicon resin. The connecting force between the organic silicon resin composition and the frame can be enhanced with the help of the adhesive promoter, so as to prevent the organic silicon resin from separating from the frame. In addition, the adhesive promoter of the present disclosure has a stable chemical structure and a high refractive property.

Specifically, the adhesive promoter is formed from a borosiloxane polymer. The boron atoms of the borosiloxane polymer can enhance the connecting force between the organic silicon resin composition and the frame of various materials. The borosiloxane polymer contains Si—O—B bonds. The bond energy of B—O bond is 537 KJ/mol and the bond energy of Si—O bond is 422 KJ/mol. Due to the Si—O—B bonds, the adhesive promoter of the present disclosure has a good structural stability to endure a high temperature environment so that the yellowing phenomenon can be prevented. A segment of the Si—O—B bond of the borosiloxane polymer consists of silicon atoms, oxygen atoms, and boron atoms, exclusive of carbon atoms. However, other segments of the borosiloxane polymer can contain carbon atoms. The present disclosure is not limited thereto.

The adhesive promoter can be represented by a general formula of: $(R^1R^2{}_2SiO_{1/2})_x(R^2R^3SiO_{2/2})_y(R^3SiO_{3/2})_z(SiO_{4/2})_i(BO_{(3-k)/2})_j(OR^4)_k$. In the general formula, "$R^1$" is a hydrogen atom or an alkenyl group having 2 to 6 carbon atoms. "$R^2$" and "$R^4$" are respectively an alkyl group having 1 to 6 carbon atoms. "$R^3$" is an aromatic group having 6 to 12 carbon atoms. In the general formula, "x", "y", "z", "i", "j", and "k" respectively represent a molar ratio. In the general formula, "x", "y", "z", "i", and "j" are respectively a non-negative number smaller than or equal to 1, and "k" is a positive number smaller than or equal to 3. A sum of "x", "y", "z", and "i" is 1, and "x" is larger than 0.

In an embodiment, when "x" is larger than 0, the adhesive promoter has silyl hydride groups ($R^1$ being hydrogen atom) or alkenyl groups. When the adhesive promoter is mixed with other organic silicon resin, the silyl hydride group or the alkenyl group of the adhesive promoter can enhance the compatibility between the adhesive promoter and the organic silicon resin. Further, the silyl hydride group or the alkenyl group of the adhesive promoter can participate in a hydrosilylation reaction. Therefore, by adding the adhesive promoter, a phase separation phenomenon can be prevented from happening in a mixture of organic silicon resin.

In an embodiment, when at least one of "y" and "z" is larger than 0, the adhesive promoter has aromatic groups. The aromatic groups can enhance refractive properties of the adhesive promoter. By adjusting an amount of the aromatic groups contained in the adhesive promoter, the refractive index of the adhesive promoter can be the same or close to the refractive index of the organic silicon resin. Accordingly, even upon adding the adhesive promoter, overall refractive properties of the organic silicon encapsulant composition will not be negatively influenced. In addition, a light extraction efficiency of the LED will not be decreased when the organic silicon encapsulant composition is used for a packaging structure of the LED.

In a preferable embodiment, when "x" is larger than 0 and at least one of "y" and "z" is larger than 0, the adhesive promoter can have a good compatibility with other organic silicon resin to prevent a phase separation phenomenon, and the adhesive promoter can have a refractive index the same or close to the refractive index of the organic silicon resin so as to prevent from negatively influencing the light extraction efficiency of the LED.

In a preferable embodiment, in the general formula, "x" ranges from 0.01 to 0.5, "y" ranges from 0 to 0.5, "z" ranges from 0 to 0.8, "i" ranges from 0 to 0.7, "j" ranges from 0.01 to 1, and "k" ranges from 1 to 3. However, the present disclosure is not limited thereto.

In a preferable embodiment, in the general formula, "$R^1$" is a substituted or unsubstituted ethylene group or a substituted or unsubstituted propylene group; "$R^2$" is a substituted or unsubstituted methyl group or a substituted or unsubstituted ethyl group; "$R^3$" is a substituted or unsubstituted phenyl group; "$R^4$" is a substituted or unsubstituted methyl group or a substituted or unsubstituted ethyl group. However, the present disclosure is not limited thereto.

[Preparation of the Adhesive Promoter]

Some embodiments of the preparation of the adhesive promoter are illustrated below.

[Adhesive Promoter 1]

23.25 g of tetramethyldivinyldisiloxane, 45.5 g of methylphenyldimethoxysilane, 99 g of phenyltrimethoxysilane, and 120 g of toluene are added in a 500 ml four-necked flask. 34.2 g of 1 wt % hydrochloric acid solution at a temperature of 40° C. is dropped into the four-necked flask to process a hydrolytic condensation reaction for 5 hours, so that a product is obtained. The product is washed by deionized water to maintain neutrality. Toluene (solvent) is removed to obtain an anhydrous product. Subsequently, 10.4 g of trimethyl borate is added and reacted with the anhydrous product at a temperature of 40° C. for 2 hours. Then, trimethyl borate and the anhydrous product are refluxed and reacted at a temperature of 80° C. for 4 hours. Finally, low boiling point components, such as methanol, are removed by distillation, thereby obtaining a colorless transparent viscous liquid. The preparation of the adhesive promoter 1 of the present disclosure is therefore complete. The adhesive promoter 1 can be represented by a general formula of: $(ViMe_2SiO_{1/2})_{0.25}(MePhSiO_{2/2})_{0.25}(PhSiO_{3/2})_{0.5}(BO_{3/2})_{0.1}(OCH_3)_{0.2}$. In the general formula, "Vi" is an abbreviation of vinyl group, "Me" is an abbreviation of methyl group, and "Ph" is an abbreviation of phenyl group.

[Adhesive Promoter 2]

46.5 g of tetramethyldivinyldisiloxane, 104 g of tetraethyl orthosilicate, and 120 g of toluene are added in a 500 ml four-necked flask. 36 g of 0.5 wt % hydrochloric acid solution is dropped into the four-necked flask at room temperature to react for 1 hour, and then the four-necked flask is heated to 80° C. to process a hydrolytic condensation reaction for 3 hours so that a product is obtained. The product is washed by deionized water to maintain neutrality. Solvent (toluene) is removed to obtain an anhydrous product. Subsequently, 5.2 g of trimethyl borate is added and reacted with the anhydrous product at a temperature of 40° C. for 2 hours. Then, trimethyl borate and the anhydrous product are refluxed and reacted at a temperature of 80° C. for 4 hours. Finally, low boiling point components, such as methanol, are removed by distillation, thereby obtaining a colorless transparent viscous liquid. The preparation of the adhesive promoter 2 of the present disclosure is therefore complete. The adhesive promoter 2 can be represented by a general formula of: $(ViMe_2SiO_{1/2})_{0.5}(SiO_{4/2})_{0.5}(BO_{3/2})_{0.05}(OCH_3)_{0.1}$.

[Adhesive Promoter 3]

16.75 g of tetramethyldisiloxane, 45.5 g of methylphenyldimethoxysilane, 99 g of phenyltrimethoxysilane, and 120 g of toluene are added in a 500 ml four-necked flask. 34.2 g of 1 wt % hydrochloric acid solution with a temperature of 40° C. is dropped into the four-necked flask to process hydrolytic condensation reaction for 5 hours so that a product is obtained. The product is washed by deionized water to maintain neutrality. Solvent (toluene) is removed to obtain an anhydrous product. Subsequently, 10.4 g (1 mol) of trimethyl borate is added and reacted with the anhydrous product at a temperature of 40° C. for 2 hours. Then, trimethyl borate and the anhydrous product are refluxed and reacted at a temperature of 80° C. for 4 hours. Finally, low boiling point components, such as methanol, are removed by distillation, thereby obtaining a colorless transparent viscous liquid. The preparation of the adhesive promoter 3 of the present disclosure is therefore complete. The adhesive promoter 3 can be represented by a general formula of: $(HMe_2SiO_{1/2})_{0.25}(MePhSiO_{2/2})_{0.25}(PhSiO_{3/2})_{0.5}(BO_{3/2})_{0.1}(OCH_3)_{0.2}$.

[Adhesive Promoter 4]

33.5 g of tetramethyldisiloxane, 104 g of tetraethyl orthosilicate, and 120 g of toluene are added in a 500 ml four-necked flask. 36 g of 0.5 wt % hydrochloric acid solution is dropped into the four-necked flask at room temperature to react for 1 hour, and then the four-necked flask is heated to 80° C. to process a hydrolytic condensation reaction for 3 hours so that a product is obtained. The product is washed by deionized water to maintain neutrality. Solvent (toluene) is removed to obtain an anhydrous product. Subsequently, 5.2 g of trimethyl borate is added and reacted with the anhydrous product at a temperature of 40° C. for 2 hours. Then, trimethyl borate and the anhydrous product are refluxed and reacted at a temperature of 80° C. for 4 hours. Finally, low boiling point components, such as methanol, are removed by distillation, thereby obtaining a colorless transparent viscous liquid. The preparation of the adhesive promoter 4 of the present disclosure is therefore complete. The adhesive promoter 4 can be represented by a general formula of: $(HMe_2SiO_{1/2})_{0.5}(SiO_{4/2})_{0.5}(BO_{3/2})_{0.05}(OCH_3)_{0.1}$.

[Adhesive Promoter 5]

23.25 g of tetramethyldivinyldisiloxane, 148.5 g of phenyltrimethoxysilane, and 120 g of toluene are added in a 500 ml four-necked flask. 40.5 g of 0.1 wt % trifluoromethanesulfonic acid solution is dropped into the four-necked flask and refluxed at a temperature of 80° C. to process a hydrolytic condensation reaction for 3 hours so that a product is obtained. Subsequently, the product is washed by deionized water to maintain neutrality. Solvent (toluene) is removed to obtain an anhydrous product. After cooling, 14.6 g of trimethyl borate is added and reacted with the anhydrous product at a temperature of 40° C. for 2 hours stirring. Then, trimethyl borate and the anhydrous product are heated and reacted at a temperature of 80° C. for 4 hours. Finally, low boiling point components, such as methanol, are removed by distillation at a temperature of 100° C.; thereby obtaining a colorless transparent viscous liquid. The preparation of the adhesive promoter 5 of the present disclosure is therefore complete. The adhesive promoter 5 can be represented by a general formula of: $(ViMe_2SiO_{1/2})_{0.25}(PhSiO_{3/2})_{0.75}(BO_{3/2})_{0.1}(OCH_3)_{0.1}$.

The present disclosure provides an organic silicon encapsulant composition including the adhesive promoter mentioned previously. The organic silicon encapsulant composition can be used for adhesion or packaging. The organic silicon encapsulant composition has a good connecting force and a high refractive property. In addition to the adhesive promoter, the organic silicon encapsulant composition includes other organic silicon resin (such as a polysiloxane having alkenyl group or a polysiloxane having silyl hydride group), a catalyst for hydrosilylation reaction, and an auxiliary. Due to the alkenyl group or the silyl hydride group of the adhesive promoter, the adhesive promoter has a good compatibility with the polysiloxane having alkenyl group and the polysiloxane having silyl hydride group. Further, the alkenyl group or the silyl hydride group of the adhesive promoter can participate in a hydrosilylation reaction. Accordingly, by adding the adhesive promoter, a phase separation phenomenon can be prevented in a mixture of organic silicon resin.

Specifically, when the organic silicon resin is a polysiloxane having alkenyl group, the organic silicon resin can be represented by a general formula of: $(R^a R^b_2 SiO_{1/2})_o (R^b R^c SiO_{2/2})_p (R^c SiO_{3/2})_q (SiO_{4/2})_r$. In the general formula, "$R^a$" is an alkenyl group having 2 to 6 carbon atoms, "$R^b$" is an alkyl group having 1 to 6 carbon atoms, and "$R^c$" is an aromatic group having 6 to 12 carbon atoms. In the general formula, "o", "p", "q", and "r" respectively represent a molar ratio, "o", "p", "q", and "r" are respectively a positive number smaller than 1, a sum of "o", "p", "q", and "r" is 1, and "o" is larger than 0.

For example, the polysiloxane having alkenyl group can be selected from the group consisting of: $(ViMe_2SiO_{1/2})_{0.25}(MePhSiO_{2/2})_{0.25}(PhSiO_{3/2})_{0.5}$, $(ViMe_2SiO_{1/2})_{0.25}(PhSiO_{3/2})_{0.7}$, $(ViMe_2SiO_{1/2})_{0.25}(Me_2SiO_{2/2})_{0.25}(Ph_2SiO_{2/2})_{0.25}(PhSiO_{3/2})_{0.5}$, $(ViMe_2SiO_{1/2})_{0.2}(Me_3SiO_{1/2})_{0.15}(SiO_{4/2})_{0.65}$, $(ViMe_2SiO_{1/2})_{0.05}(MePhSiO_{2/2})_{0.95}$, and $(ViMe_2SiO_{1/2})_{0.05}(Me_2SiO_{2/2})_{0.95}$. However, the present disclosure is not limited thereto. In the present embodiment, "o" ranges from 0.1 to 0.35, "p" ranges from 0 to 0.4, "q" ranges from 0 to 0.75, and "r" ranges from 0 to 0.65.

Specifically, when the organic silicon resin is a polysiloxane having silyl hydride group, the organic silicon resin can be represented by a general formula of: $(HR^e_2SiO_{1/2})_s(R^e R^f SiO_{2/2})_t(R^f SiO_{3/2})_u(SiO_{4/2})_v$. In the general formula, "$R^e$" is an alkyl group having 1 to 6 carbon atoms, and "$R^f$" is an aromatic group having 6 to 12 carbon atoms. In the general formula, "s", "t", "u", and "v" are respectively a non-negative number smaller than or equal to 1, a sum of "s", "t", "u", and "v" is 1, and "s" is larger than 0.

For example, the polysiloxane having silyl hydride group can be selected from the group consisting of: $(HMe_2SiO_{1/2})_{0.3}(PhSiO_{3/2})_{0.7}$ and $(HMe_2Si_{1/2})_{0.1}(HMeSiO_{2/2})_{0.9}$. However, the present disclosure is not limited thereto. In the present embodiment, "s" ranges from 0.1 to 0.4, "t" ranges from 0 to 0.4, "u" ranges from 0 to 0.6, and "v" ranges from 0 to 0.6.

In the present embodiment, the organic silicon encapsulant composition can include various organic silicon resins. In other words, the organic silicon encapsulant composition can include one or more kinds of the polysiloxane having alkenyl group and one or more kinds of the polysiloxane having silyl hydride group. Therefore, properties of an organic silicon encapsulant cured from the organic silicon encapsulant composition can be adjusted according to requirement. For example, two kinds of the polysiloxane having alkenyl group respectively represented by $(ViMe_2SiO_{1/2})_{0.05}(Me_2SiO_{2/2})_{0.95}$ and $(ViMe_2Si_{1/2})_{0.2}(Me_3SiO_{1/2})_{0.15}(SiO_{4/2})_{0.6}$ are usually mixed with each other, since $(ViMe_2SiO_{1/2})_{0.05}(Me_2SiO_{2/2})_{0.95}$ has an insufficient structural intensity.

In a preferable embodiment, the organic silicon encapsulant composition includes at least one of the polysiloxane having alkenyl group and at least one of the polysiloxane having silyl hydride group. In addition, a molar ratio of the alkenyl group of the polysiloxane having alkenyl group to the silyl hydride group of the polysiloxane having silyl hydride group ranges from 0.5 to 2.5. If an amount of the silyl hydride group is insufficient, the organic silicon encapsulant composition will be cured incompletely, or a hardness of the organic silicon encapsulant will be dramatically decreased. In addition, excessive alkenyl group may cause the organic silicon encapsulant to be yellowing. On the other hand, if an amount of the silyl hydride group is excessive, the organic silicon encapsulant composition will still be cured incompletely, and the excessive silyl hydride groups tend to dehydrogenate at high temperature, which causes the organic silicon encapsulant to be easily cleaved, a hardness of the organic silicon encapsulant to be dramatically increased, or the organic silicon encapsulant to easily exhibit yellowing.

Specifically, the catalyst, such as a platinum-containing complex, is used for accelerating the reaction rate of hydrosilylation. In the embodiment, a chloroplatinic acid isopropanol solution is used as the catalyst. However, the present disclosure is not limited thereto.

Specifically, the auxiliary includes inhibitor (such as alkynyl cyclohexanol or multi-vinyl polymer) and/or inorganic filler (such as silicon dioxide or fluorescent powder). However, the present disclosure is not limited thereto.

Specifically, the organic silicon encapsulant composition includes 30 phr (part per weight) to 80 phr of the polysiloxane having alkenyl group, 30 phr to 70 phr of a polysiloxane having silyl hydride group, 0.001 phr to 0.1 phr of a catalyst for hydrosilylation reaction, and 0.01 phr to 5 phr of borosiloxane polymer.

The present disclosure provides an organic silicon encapsulant. The organic silicon encapsulant is cured from the organic silicon encapsulant composition. The organic silicon encapsulant can be used as a material of various packaging structures. A hardness of the organic silicon encapsulant can be adjusted according to different requirements. It should be noted that the organic silicon encapsulant of the present disclosure has a high adhesive force even with metal or other materials with low surface energy. Therefore, the organic silicon encapsulant can be specially applied in a packaging structure of the LED so as to prevent water vapor from permeating into and then contacting to the LED.

In order to prove the effects of the adhesive promoter of the present disclosure, the components used in the organic silicon encapsulant composition are listed in Table 1.

In Table 1, organic silicon resins A1 to A3 are polysiloxane having alkenyl groups. The organic silicon resin A1 is represented by $(ViMe_2Si_{1/2})_{0.25}(MePhSiO_{2/2})_{0.25}(PhSiO_{3/2})_{0.5}$. The organic silicon resin A2 is represented by $(ViMe_2SiO_{1/2})_{0.2}(Me_3SiO_{1/2})_{0.15}(SiO_{4/2})_{0.65}$. The organic silicon resin A3 is represented by $(ViMe_2SiO_{1/2})_{0.05}(Me_2SiO_{2/2})_{0.95}$. In Table 1, organic silicon resins B1 and B2 are polysiloxane having silyl hydride groups. The organic silicon resin B1 is represented by $(HMe_2SiO_{1/2})_{0.3}(PhSiO_{3/2})_{0.7}$. The organic silicon resin B2 is represented by $(HMe_2SiO_{1/2})_{0.1}(HMeSiO_{2/2})_{0.9}$.

TABLE 1 contents of components in the organic silicon encapsulant composition
Organic silicon encapsulant composition

| Component (phr) | | Example 1 | 2 | 3 | 4 | 5 | Comparative Example 1 | 2 | 3 |
|---|---|---|---|---|---|---|---|---|---|
| Organic silicon resin | A1 | 55 | | 55 | | 55 | 55 | 55 | |
| | A2 | | 45 | | 45 | | | | 45 |
| | A3 | | 45 | | 45 | | | | 45 |
| | B1 | 45 | | 45 | | 45 | 45 | 45 | |
| | B2 | | 10 | | 10 | | | | 10 |
| Adhesive promoter | 1 | 1 | | | | | | | |
| | 2 | | 1 | | | | 1 | | |
| | 3 | | | 1 | | | | | |
| | 4 | | | | 1 | | | | |
| Trimethyl borate | | | | | | | | 1 | |
| Catalyst | | 0.04 | 0.04 | 0.04 | 0.04 | 0.04 | 0.04 | 0.04 | 0.04 |
| Alkynyl Cyclohexanol | | 0.02 | 0.02 | 0.02 | 0.02 | 0.02 | 0.02 | 0.02 | 0.02 |

Further, properties of the organic silicon encapsulant cured from the organic silicon encapsulant composition are measured. The testing results are listed in Table 2.

In Table 2, the organic silicon encapsulant is subjected to a thrust strength test. In the thrust strength test, the organic silicon encapsulant composition is applied on aluminum metal, and then cured to form the organic silicon encapsulant. Subsequently, the thrust strength of the organic silicon encapsulant is measured and listed in Table 2. In addition, the organic silicon encapsulant is also subjected to a thermal shock test. In the thermal shock test, a LED (a high power LED provided by Osram—model no. 3838) is disposed on a frame whose material is epoxy molding compound (EMC). Then, the frame with the LED is subjected to a compression molding by the organic silicon encapsulant for 7 to 8 minutes. After baking at a temperature of 150° C. for 3 hours, the organic silicon encapsulant is cut and is observed to determine whether the organic silicon encapsulant is separated from the frame. Continuingly, the frame with the organic silicon encapsulant is baked at a temperature of 120° C. for 1 hour. Finally, the frame with the organic silicon encapsulant is subjected to the thermal shock test for 100 cycles between a temperature range of −55° C. to 105° C. with a rate of 30 minutes per cycle. After the thermal shock test, the organic silicon encapsulant is observed to determine whether the organic silicon encapsulant is separated from the frame and the result of the thermal shock test are listed in Table 2.

In addition to the thrust strength test and the thermal shock test, the organic silicon encapsulant is also subjected to a refractive index test, a transmittance test, and a hardness test. The light extraction efficiency of the LED is influenced by the refractive index and the transmittance of the organic silicon encapsulant, and mechanical properties of the LED is influenced by the hardness of the organic silicon encapsulant.

TABLE 2 properties of the organic silicon encapsulant
Organic silicon encapsulant

| Properties | Example | | | | | Comparative Example | | |
|---|---|---|---|---|---|---|---|---|
| | 1 | 2 | 3 | 4 | 5 | 1 | 2 | 3 |
| Transmittance (thickness: 2 mm) | 97% | 97% | 97% | 97% | 82% | 97% | 97% | 97% |
| Refractive index | 1.5380 | 1.4101 | 1.5412 | 1.4115 | 1.5320 | 1.5368 | 1.5405 | 1.4105 |
| Hardness | 60D | 50A | 59D | 49A | 59D | 59D | 61D | 51A |
| Thrust strength(MPa) | 7.0 | 6.2 | 6.9 | 6.3 | 6.8 | 5.6 | 5.0 | 4.4 |
| Thermal shock test | No peeling | No peeling | No peeling | No peeling | No peeling | Peeling | Peeling | Peeling |

According to Table 2, the organic silicon resins used in Comparative Examples 1 to 3 are the same as the organic silicon resins used in Examples 1 to 5; while the organic silicon encapsulant compositions of Comparative Examples 1 to 3 are without the adhesive promoter. Therefore, the thrust strengths of the organic silicon encapsulant of Examples 1 to 5 (5.7 to 10 MPa) are higher than the thrust strengths of the organic silicon encapsulant of Comparative Examples 1 to 3 (4.4 to 5.6 MPa). In other words, when a material of the frame is aluminum, the organic silicon encapsulant of the present disclosure has a stronger connecting force with the frame.

According to Table 2, in the thermal shock test, the organic silicon encapsulant is not separated from the frame after 100 cycles. In other words, the organic silicon encapsulant not only has a good connecting force with a metal frame but also has temperature durability. Even in an environment with severe changes in temperature, the organic silicon encapsulant will not be separated from the frame.

In addition, the organic silicon encapsulant is subjected to other tests. According to Table 2, the hardness of the organic silicon encapsulant ranges from 40A to 75D so as to have a sufficient physical intensity. Therefore, the organic silicon encapsulant can fix an LED chip onto the frame and protect the LED chip.

According to Table 2, the refractive index of the organic silicon encapsulant ranges from 1.4 to 1.6 so as to match with the LED chip. The transmittance of the organic silicon encapsulant of the present disclosure is larger than or equal to 80%. Taking Example 5 for example, the refractive index of the adhesive promoter is 1.41 and the refractive index of the organic silicon resin is 1.54. Due to a difference between the refractive indexes, the transmittance of the organic silicon encapsulant is merely 82%. Therefore, in order to enhance the light extraction efficiency (high transmittance), the refractive index of the adhesive promoter can be adjusted to close to the refractive index of the organic silicon resin, so that the transmittance of the organic silicon encapsulant can be larger than or equal to 90%.

In conclusion, the technical features of "the organic silicon encapsulant is formed from a borosiloxane polymer" and "$R^1$ is a hydrogen atom or an alkenyl group having 2 to 6 carbon atoms" can enhance the compatibility between the adhesive promoter and the organic silicon resin in the organic silicon encapsulant composition and can enhance the connecting force between the organic silicon encapsulant composition and the frame, thereby allowing the organic silicon encapsulant composition to be applied in a packaging structure of LEDs.

The technical feature of "the borosiloxane polymer contains Si—O—B bonds" can enhance the structural stability of the adhesive promoter so as to increase its endurance against high temperature and prevent yellowing thereof.

The technical feature of "$R^1$ is a hydrogen atom, a substituted or unsubstituted ethylene group, or a substituted or unsubstituted propylene group" can enhance the compatibility between the adhesive promoter and the organic silicon resin in the organic silicon encapsulant composition and prevent a phase separation phenomenon. In addition, $R^1$ can participate in a hydrosilylation reaction.

The technical feature of "$R^3$ is a substituted or unsubstituted phenyl group" can enable refractive properties of the adhesive promoter to match with refractive properties of the organic silicon resin, so that the light extraction efficiency of the LED will not be negatively influenced.

The technical feature of "a molar ratio of the alkenyl group of the polysiloxane having alkenyl group to the silyl hydride group of the polysiloxane having silyl hydride group ranges from 0.5 to 2.5" can enable the organic silicon encapsulant to have good physical properties.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An adhesive promoter used for an organic silicon encapsulant which is formed from a borosiloxane polymer, the borosiloxane polymer being represented by a general formula of:

$R^1R^2{}_2SiO_{1/2})_x(R^2R^3SiO_{2/2})_y(R^3SiO_{3/2})_z(SiO_{4/2})_i(R^4O)_k(BO_{(3-m)/2})_j$;

wherein $R^1$ is a hydrogen atom or an alkenyl group having 2 to 6 carbon atoms, $R^2$ and $R^4$ are respectively an alkyl group having 1 to 6 carbon atoms, and $R^3$ is an aromatic group having 6 to 12 carbon atoms;

wherein x, y, z, i, j, and k respectively represent a molar ratio, x ranges from 0.01 to 0.5, y ranges from 0 to 0.5, z ranges from 0 to 0.8, i ranges from 0 to 0.7, j ranges from 0.01 to 1, k ranges from 1 to 3, m is a positive number smaller than or equal to 3, and a sum of x, y, z, and i is 1.

2. The adhesive promoter according to claim 1, wherein $R^1$ is a hydrogen atom, a substituted or unsubstituted vinyl group, or a substituted or unsubstituted propenyl group.

3. The adhesive promoter according to claim 1, wherein $R^2$ is a substituted or unsubstituted methyl group, or a substituted or unsubstituted ethyl group.

4. The adhesive promoter according to claim 1, wherein $R^3$ is a substituted or unsubstituted phenyl group.

5. The adhesive promoter according to claim 1, wherein $R^4$ is a substituted or unsubstituted methyl group, or a substituted or unsubstituted ethyl group.

6. An organic silicon encapsulant composition, comprising:
  25 phr to 80 phr of a polysiloxane having alkenyl group;
  5 phr to 70 phr of a polysiloxane having silyl hydride group;
  0.001 phr to 0.1 phr of a catalyst for hydrosilylation reaction; and
  0.01 phr to 5 phr of an adhesive promoter which is a borosiloxane polymer being represented by a general formula of:
  $R^1R^2{}_2SiO_{1/2})_x(R^2R^3SiO_{2/2})_y(R^3SiO_{3/2})_z(SiO_{4/2})_i(R^4O)_k(BO_{(3-m)/2})_j$; wherein $R^1$ is a hydrogen atom or an alkenyl group having 2 to 6 carbon atoms, $R^2$ and $R^4$ are respectively an alkyl group having 1 to 6 carbon atoms, and $R^3$ is an aromatic group having 6 to 12 carbon atoms; wherein x, y, z, i, j, and k respectively represent a molar ratio, x, y, z, i, and j are respectively a non-negative number smaller than or equal to 1, j ranges from 0.01 to 1, k ranges from 1 to 3, m is a positive number smaller than or equal to 3 a sum of x, y, z, and i is 1, and x is larger than 0.

7. The organic silicon encapsulant composition according to claim 6, wherein a molar ratio of the alkenyl group of the polysiloxane having alkenyl group to the silyl hydride group of the polysiloxane having silyl hydride group ranges from 0.5 to 2.5.

8. The organic silicon encapsulant composition according to claim 6, wherein the alkenyl group of the polysiloxane having alkenyl group is represented by a general formula of:
$(R^aR^b{}_2SiO_{1/2})_o(R^bR^cSiO_{2/2})_p(R'SiO_{3/2})_q(SiO_{4/2})_r$;
  wherein $R^a$ is an alkenyl group having 2 to 6 carbon atoms, $R^b$ is an alkyl group having 1 to 6 carbon atoms, and $R^c$ is an aromatic group having 6 to 12 carbon atoms;
  wherein o, p, q, and r respectively represent a molar ratio, o, p, q, and r are respectively a positive number smaller than 1, a sum of o, p, q, and r is 1, and o is larger than 0.

9. The organic silicon encapsulant composition according to claim 6, wherein o ranges from 0.1 to 0.35, p ranges from 0 to 0.4, q ranges from 0 to 0.75, and r ranges from 0 to 0.65.

10. The organic silicon encapsulant composition according to claim 6, wherein the polysiloxane having silyl hydride group is represented by a general formula of:
$(HR^e{}_2SiO_{1/2})_s(R^eR^fSiO_{2/2})_t(R^fSiO_{3/2})_u(SiO_{4/2})_v$;
  wherein $R^e$ is an alkyl group having 1 to 6 carbon atoms, and $R^f$ is an aromatic group having 6 to 12 carbon atoms;
  wherein s, t, u, and v are respectively a non-negative number smaller than or equal to 1, a sum of s, t, u, and v is 1, and s is larger than 0.

11. The organic silicon encapsulant composition according to claim 6, wherein s ranges from 0.1 to 0.4, t ranges from 0 to 0.4, u ranges from 0 to 0.6, and v ranges from 0 to 0.6.

12. An organic silicon encapsulant which is solidified from the organic silicon encapsulant composition according to claim 6, wherein a thrust force of the organic silicon encapsulant on an aluminum metal ranges from 5.7 MPa to 10 MPa.

13. The organic silicon encapsulant according to claim 12, wherein a light transmittance of the organic silicon encapsulant is larger than or equal to 90%.

* * * * *